(12) United States Patent
Barkan et al.

(10) Patent No.: US 11,847,521 B2
(45) Date of Patent: Dec. 19, 2023

(54) SYSTEM AND METHOD OF SELECTIVE AUXILIARY DATA CAPTURE

(71) Applicant: ZEBRA TECHNOLOGIES CORPORATION, Lincolnshire, IL (US)

(72) Inventors: Edward Barkan, Miller Place, NY (US); Christopher J. Fjellstad, Smithtown, NY (US); Robert James Pang, Williston Park, NY (US); Abhilash Gururaja, Levittown, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/100,438

(22) Filed: Jan. 23, 2023

(65) Prior Publication Data
US 2023/0161982 A1   May 25, 2023

Related U.S. Application Data

(63) Continuation of application No. 16/723,220, filed on Dec. 20, 2019, now Pat. No. 11,562,157.

(51) Int. Cl.
*G06K 7/10* (2006.01)
*G06K 7/14* (2006.01)

(52) U.S. Cl.
CPC ....... *G06K 7/10366* (2013.01); *G06K 7/1413* (2013.01)

(58) Field of Classification Search
CPC .................................................. G06K 7/1413
USPC .......................................................... 235/451
See application file for complete search history.

(56) References Cited

U.S. PATENT DOCUMENTS

| | | | |
|---|---|---|---|
| 2004/0020989 A1* | 2/2004 | Muramatsu | G06K 19/06037 235/462.1 |
| 2018/0040150 A1 | 2/2018 | Saporetti | |

OTHER PUBLICATIONS

International Search Report and Written Opinion for International Application No. PCT/US2020/051056 dated Nov. 13, 2020.

* cited by examiner

*Primary Examiner* — Rafferty D Kelly
(74) *Attorney, Agent, or Firm* — Yuri Astvatsaturov

(57) ABSTRACT

A method of auxiliary data capture control includes: storing, at a data capture device, (i) detection criteria corresponding to events having respective event identifiers; and (ii) a registration indicator associated with at least one of the event identifiers; controlling a primary data capture sensor to obtain primary captured data; in response to detecting, based on the primary captured data, that the detection criteria are satisfied for a detected one of the event identifiers, determining whether the registration indicator is associated with the detected event identifier; and when the registration indicator is associated with the detected event identifier, controlling an auxiliary data capture sensor to obtain auxiliary captured data.

22 Claims, 6 Drawing Sheets

SYSTEM AND METHOD OF SELECTIVE AUXILIARY DATA CAPTURE

CROSS-REFERENCE TO RELATED APPLICATIONS

The current application is a continuation of U.S. patent application Ser. No. 16/723,220, filed on Dec. 20, 2019, and incorporated herein by reference in its entirety.

BACKGROUND

Data capture devices, such as barcode scanners, can capture various types of data, and provide such data to host computers for further processing. Certain types of data, such as images, can be computationally costly for the host computers to process.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
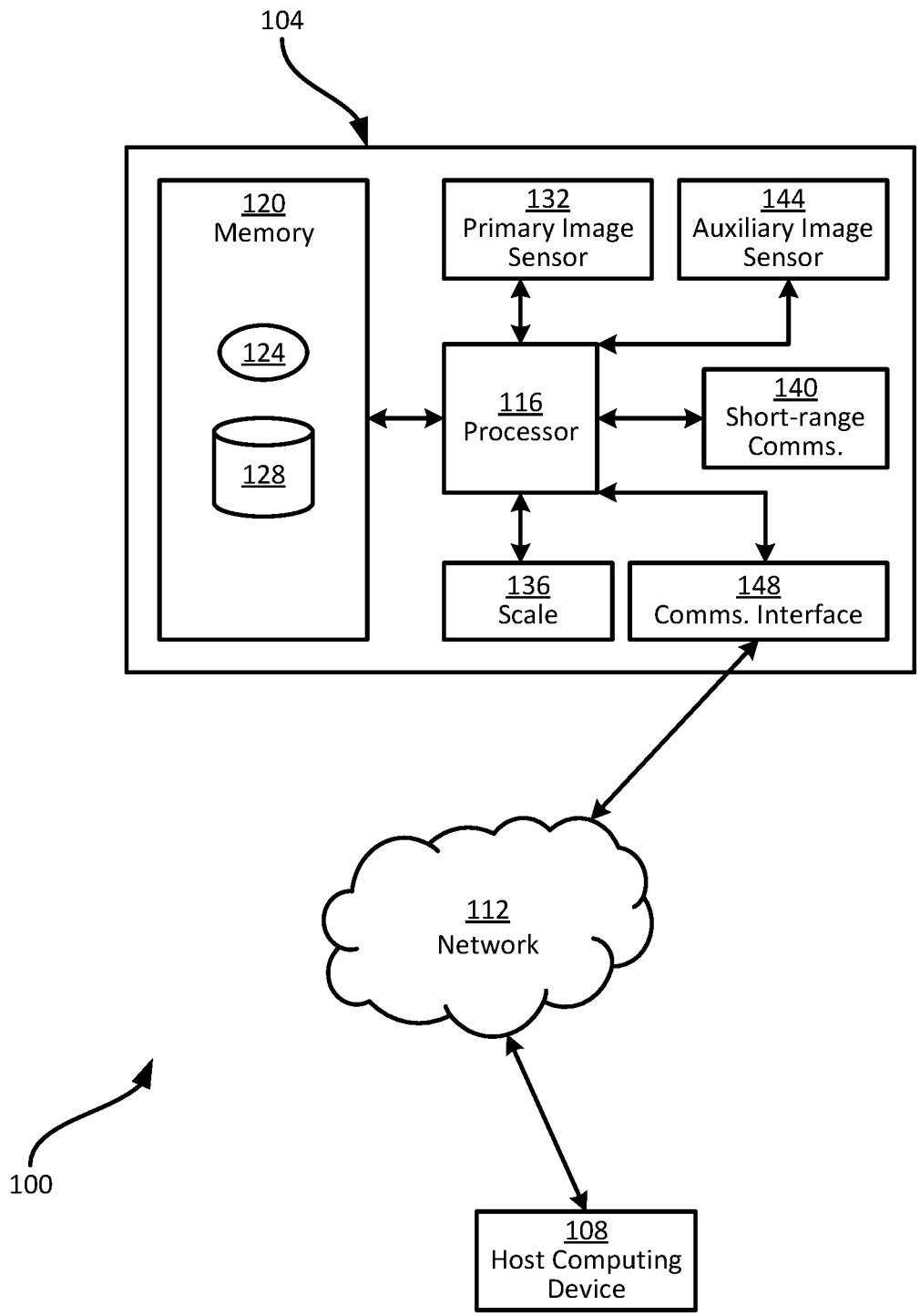
FIG. 1 is a block diagram of a system for selective auxiliary data capture.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of auxiliary data capture control, the method comprising: storing, at a data capture device, (i) detection criteria corresponding to events having respective event identifiers; and (ii) a registration indicator associated with at least one of the event identifiers; controlling a primary data capture sensor to obtain primary captured data; in response to detecting, based on the primary captured data, that the detection criteria are satisfied for a detected one of the event identifiers, determining whether the registration indicator is associated with the detected event identifier; and when the registration indicator is associated with the detected event identifier, controlling an auxiliary data capture sensor to obtain auxiliary captured data.

Additional examples disclosed herein are directed to a data capture device, comprising: a memory storing (i) detection criteria corresponding to events having respective event identifiers; and (ii) a registration indicator associated with at least one of the event identifiers; a primary data capture sensor; an auxiliary data capture sensor; and a processor connected with the memory, the primary data capture sensor and the auxiliary data capture sensor, the processor configured to: control the primary data capture sensor to obtain primary captured data; in response to detecting, based on the primary captured data, that the detection criteria are satisfied for a detected one of the event identifiers, determine whether the registration indicator is associated with the detected event identifier; and when the registration indicator is associated with the detected event identifier, control the auxiliary data capture sensor to obtain auxiliary captured data.

FIG. 1 illustrates a system 100 for capturing primary and auxiliary data associated with items. Example items include products in a retail facility. Primary data associated with such items can include product identifiers such as Universal Product Codes (UPCs), which may be encoded in an indicium such as a barcode affixed to an item or stored in a radio frequency identification (RFID) tag affixed to the item. Another example of primary data includes a weight of the item. A further example of primary data includes an indication of the presence of an Electronic Article Surveillance (EAS) tag affixed to the item.

The system 100 includes a data capture device 104 configured to capture the above-mentioned primary data. The data capture device 104 can provide the primary data to a host computing device 108, for example via a network 112, which can include any suitable combination of local and wide-area networks. The host computing device 108 can include, for example, a point-of-sale (PoS) computing device configured to further process the primary data. Such processing can include retrieving additional information (e.g. a price) from a database stored at, or otherwise connected with, the host computing device 108. Such information can be presented on a display of the host computing device, printed on a receipt, and the like.

The host computing device 108 can also be configured to perform other functions that employ data beyond the primary data mentioned above, referred to as auxiliary data. For example, the host computing device 108 can be configured to implement at least one item recognition mechanism, for example to detect the type of an item when the item does not carry a product identifier (e.g. encoded in a barcode or RFID tag). Another example function that uses auxiliary data includes storing an image of the surroundings of the data capture device 104 at the time that the primary data was captured, e.g. for security purposes.

The auxiliary data includes image data in the examples discussed herein, although in other examples the auxiliary data can include other types of data in addition to, or instead of, image data. Implementing functions that use auxiliary data can be costly in terms of computational and storage resources. Therefore, the system 100 enables selective capture of auxiliary data that may mitigate the above-mentioned computational and storage costs.

The data capture device 104 includes a controller such as a central processing unit (CPU), also referred to as a processor 116 interconnected with a non-transitory computer readable storage medium, such as a memory 120. The memory 120 includes any suitable combination of volatile memory (e.g. Random Access Memory (RAM)) and non-volatile memory (e.g. read only memory (ROM), Electrically Erasable Programmable Read Only Memory (EEPROM), flash). The processor 116 and the memory 120 each comprise one or more integrated circuits (ICs).

The processor 116, as will be discussed in greater detail below, controls various data capture sensors of the data capture device 104 to capture the above-mentioned primary and auxiliary data. The processor 116 also determines, based on captured primary data, when to capture auxiliary data. In particular, the processor 116 executes machine-readable instructions stored in the memory 120 and referred to herein as a data capture control application 124 (or simply as the application 124) to perform the above functionality. Execution of the application 124 configures the processor 116 to capture and provide primary data to the host computing device 108, and also to determine, based at least in part on a repository 128 stored in the memory 120, whether to trigger the capture of auxiliary data.

The repository 128 contains registration indicators corresponding to at least one event for which detection criteria are defined in the application 124. When a given event is detected and is associated with a registration indicator in the repository 128, the processor 116 initiates the capture of auxiliary data.

In other examples, the contents of the repository 128 can be integrated into the application 124. In addition, the functionality discussed herein need not be implemented via the execution of a single application. In other examples, the memory 120 can store at least one application enabling the processor 116 to control the data capture sensors mentioned earlier. Such an application may expose, via an application programming interface (API) or the like, event identifiers to an additional application that determines when to capture auxiliary data.

The above-mentioned data capture sensors include at least one primary data capture sensor and at least one auxiliary data capture sensor. In the illustrated example, the data capture device 104 includes three primary data capture sensors, including a primary image sensor 132, a weigh-scale 136 (also referred to simply as a scale 136), and a short-range communications assembly 140. Other examples of primary data capture sensors include a laser-based barcode scanner (e.g. instead of, or in addition to, the primary image sensor 132), an infrared sensor and the like.

The auxiliary data capture sensor, in the illustrated example, is an auxiliary image sensor 144. The auxiliary image sensor 144, in this example, is a color image sensor, while the primary image sensor 132 can be a black and white image sensor. Further, the auxiliary image sensor 144 may have a greater resolution than the primary image sensor 132.

The data capture device 104 also includes a communications interface 148, enabling the data capture device 104 to exchange data with other computing devices, such as the host computing device 108. The communications interface 148 includes any suitable hardware (e.g. Network Interface Controllers (NICs), Universal Serial Bus (USB) controllers, and the like) allowing the data capture device 104 to communicate over the network 112.

Figure 2:
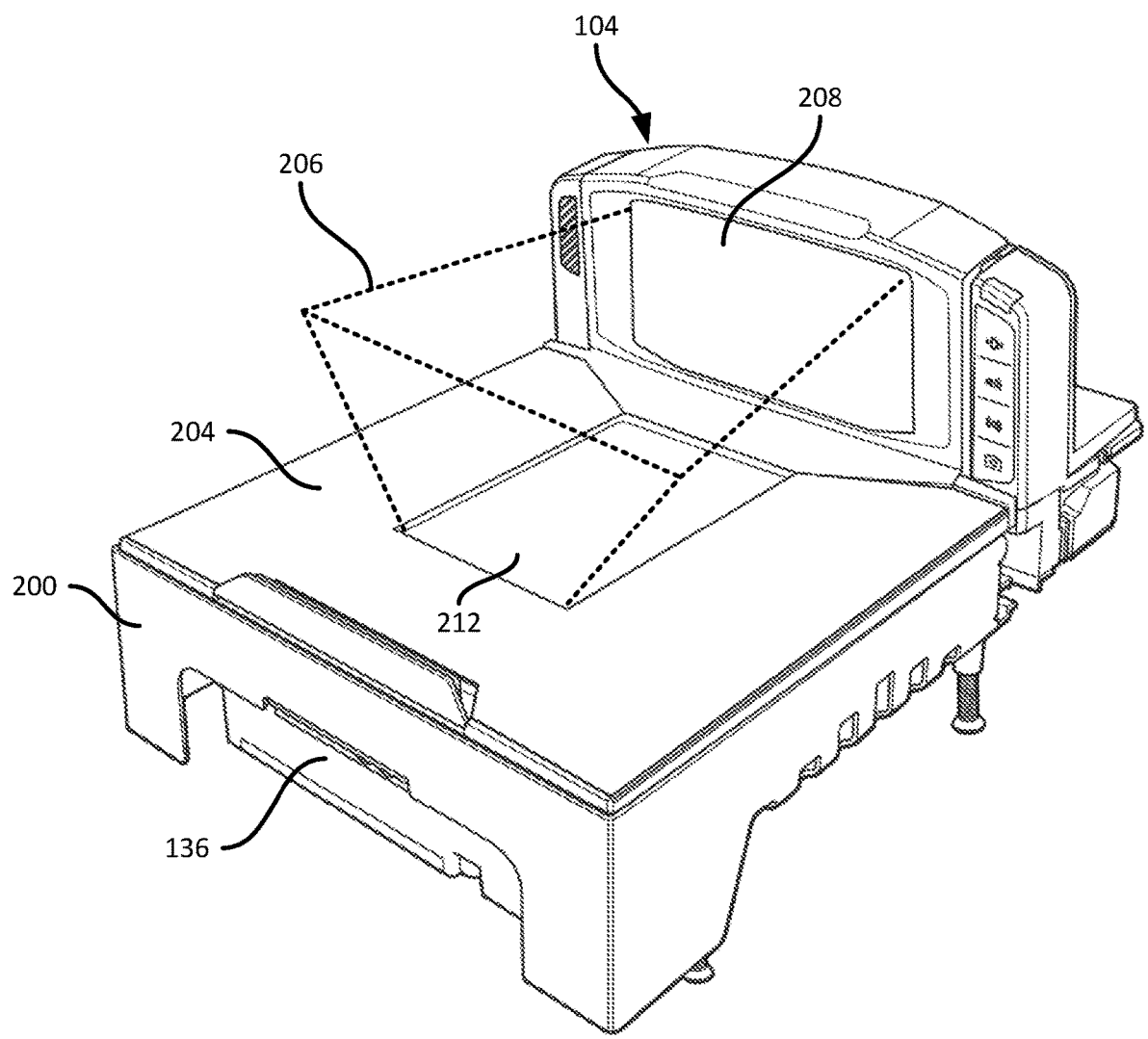
FIG. 2 is an isometric view of a data capture device of the system of FIG. 1.

The above-mentioned components of the data capture device 104 can be implemented in various form factors. Turning to FIG. 2, an example data capture device 104 is shown in the form of a bioptic scanner that can be mounted in a retail checkout countertop or other support surface.

In the example illustrated in FIG. 2, the data capture device 104 includes a housing 200 containing the components mentioned above in connection with FIG. 1. The housing defines a platform 204 on which items may be placed and over which a scan volume 206 is defined, e.g. by scan windows 208 and 212. The scale 136 is coupled to the platform 204, and the primary image sensor 132 has a field of view extending from at least one of the windows 208 and 212. The data capture device 104 can include an optical assembly enabling the primary image sensor 132 to capture images via either window 208 and 212, or the data capture device 104 can include two primary image sensors, with respective fields of view traversing the scan windows 208 and 212.

The auxiliary image sensor 144 is also disposed within the housing 200 such that a field of view of the auxiliary image sensor 144 extends from one of the scan windows 208 and 212. In other examples, however, the auxiliary image sensor 144 can be contained in another housing separate from the housing 200, and communicatively coupled with the processor 116 (within the housing 200). In further examples, the auxiliary image sensor 144 can deployed along with an auxiliary controller distinct from the processor 116, and an auxiliary communications interface (e.g. a USB interface) distinct from the interface 148. In such implementations, the auxiliary controller can communicate with both the processor 116 and the host computing device 108.

Figure 3:
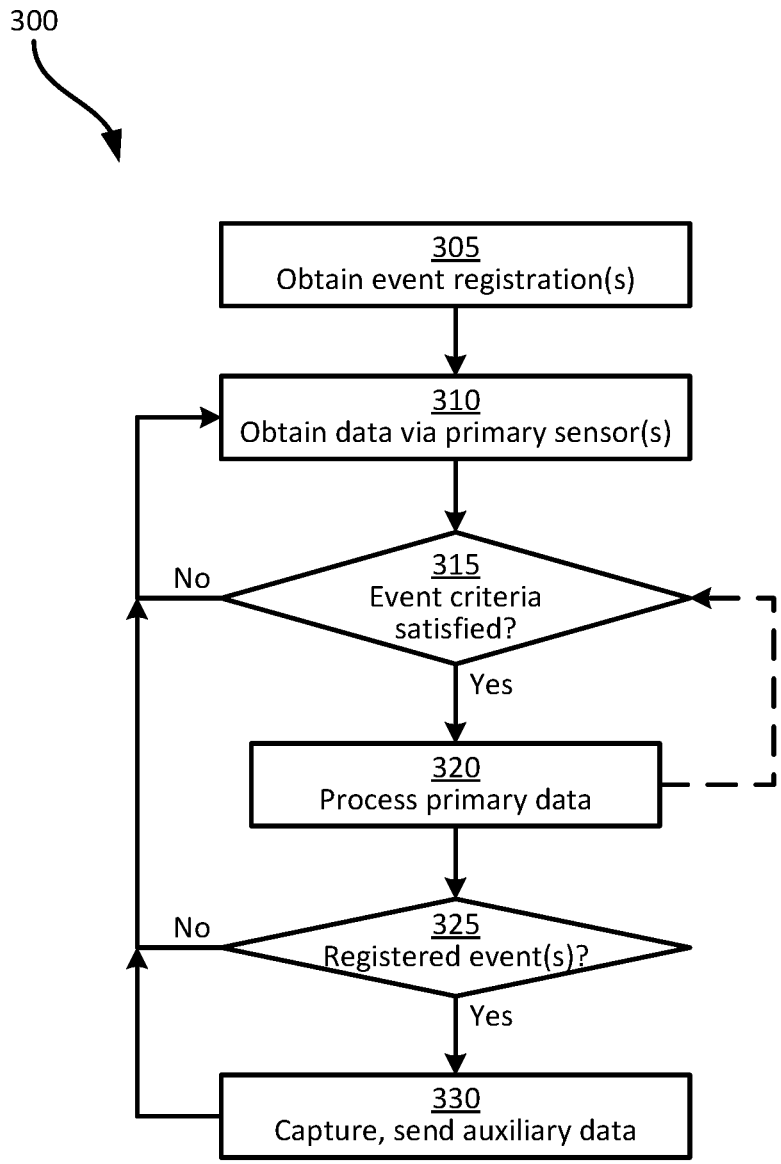
FIG. 3 is a flowchart of a method of selective auxiliary data capture.

As will be apparent to those skilled in the art, primary data capture may be initiated by passing an item through the scan volume 206, placing an item on the platform 204, activating an input of the device 104, or the like. Turning now to FIG. 3, the actions performed by the data capture device 104 during primary data capture operations in order to control auxiliary data capture will be described in greater detail.

FIG. 3 illustrates a method 300 of selective auxiliary data capture. The method 300 will be described below in conjunction with its performance in the system 100, and in particular by the data capture device 104. It is contemplated, however, that the method 300 can also be performed in various other suitable systems.

At block 305, the data capture device 104 is configured to obtain event registrations. The data capture device 104 stores (e.g. within the application 124) event detection criteria corresponding to a plurality of events. When the detection criteria for a given event are satisfied, the processor 116 generates an event identifier, which may be processed in various ways.

Various events and corresponding detection criteria are contemplated. For example, when an indicium such as a barcode is detected in an image captured by the primary image sensor 132, and data is successfully decoded from the barcode, the data capture device 104 can be configured to transmit the decoded data to the host computing device 108. The host computing device 108, in turn, can be configured to return a "scan disable" command to the data capture device 104. The scan disable command instructs the data capture device 104 to pause primary data capture, e.g. for a predefined period of time (e.g. one second, although shorter and longer time periods are also contemplated) or until a resume command is received from the host computing device 108. Processing of decoded data by the host computing device 108 may consume more time than the next capture operation at the data capture device 104. The scan disable command can therefore be employed to enable the host computing device 108 to complete processing of the decoded data before the data capture device 104 sends additional decoded data. Various other example events and detection criteria associated therewith will be described below.

An event registration is associated with a specific event, and is an indication that when that event occurs (i.e. when the detection criteria defining that event are satisfied), the data capture device 104 is to capture auxiliary data for provision to the host computing device 108. In other words, event registrations indicate which events the host computing device 108 is subscribed to. The event registrations are stored in the repository 128 in the present example. For example, the repository 128 can contain registration indicators in the form of event identifiers of events to which the host computing device 108 is subscribed. In other examples, the repository 128 can contain each event identifier, and a flag associated therewith indicating whether or not the host computing device 108 is subscribed to that event.

The event registrations can be obtained at block 305 at the time of deployment of the application 124 to the data capture device 104 (that is, the event registrations can be hard-coded at the data capture device 104). In other examples, the event registrations can be received from the host computing device 108 separately from deployment of the application 124, e.g. in a request via the network 112. In further examples, in which the auxiliary image sensor 144 is associated with a distinct auxiliary controller and auxiliary communications interface, the event registrations can be stored in a memory connected to the auxiliary controller rather than in the repository 128. That is, the host computing device 108 can pass event registrations to the auxiliary controller via the auxiliary communications interface.

At block 310, the data capture device 104 is configured to control at least one of the data capture sensors mentioned above to capture data. For example, the processor 116 can enable at least one of the primary image sensor 132, the scale 136 and the short-range interface 140. Enabling the primary image sensor 132 may include capturing a stream of image frames at a suitable frequency and evaluating each frame according to the event detection criteria mentioned above.

At block 315, the data capture device 104 is configured to determine whether any of the event detection criteria mentioned above are satisfied by the data captured via the primary data capture sensors at block 310. When the determination at block 315 is affirmative the data capture device 104 proceeds to block 320 to process the captured data. When the determination at block 315 is negative, the data capture device 104 can discard the data captured at block 310, and repeat the performance of block 310 to capture further data. As indicated by the dashed line from block 320 to block 315, a single capture of data at block 310 may also be evaluated more than once for event criteria. In other examples, block 320 can precede block 315.

Figure 4:
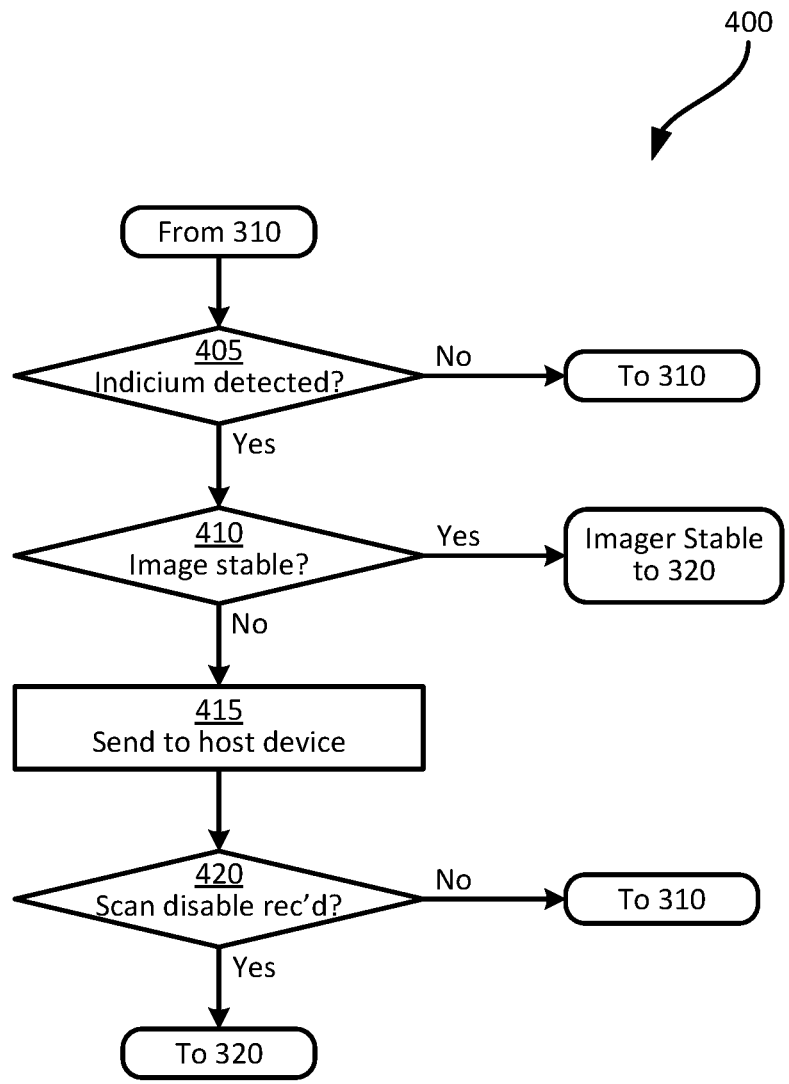
FIG. 4 is a flowchart of a method for performing blocks 315 and 320 of the method of FIG. 3.

As noted earlier, various forms of event criteria can be evaluated at block 315. Turning to FIG. 4, an example method 400 of implementing blocks 315 and 320 is illustrated. In particular, the method 400 implements two sequential instances of blocks 315 and 320. At block 405, the processor 116 determines whether an indicium such as a barcode, QR Code, Digimarc or the like has been detected in a frame of image data captured via the primary image sensor 132. When the determination at block 405 is negative, the processor 116 returns to block 310 (i.e. a negative determination at block 405 is equivalent to a negative determination at block 315).

When the determination at block 405 is affirmative, the processor 116 proceeds to block 410. In other examples, the processor 116 can perform block 410 regardless of the determination at block 405. In further examples, following an affirmative determination at block 405 the processor 116 can generate a "Decode" event before proceeding to block 410. The Decode event indicates that an indicium has been detected and decoded at block 405, and can also be employed to trigger the capture of auxiliary data.

At block 410 the processor 116 determines whether the image captured at block 305 via the primary image sensor 132 is sufficiently similar to a preceding image (e.g. the previous captured frame from the primary image sensor 132). Various mechanisms for measuring similarity between images may be implemented at block 410, including those based on feature matching (with an affirmative determination resulting at block 410 when threshold number or proportion of matching features are detected between the current and previous frames).

In other examples, the processor can perform the determination at block 410 by determining whether the code detected in the captured frame at block 405 is a new code. A new code is one that does not match a preceding code (i.e. detected in the previous frame of image data from the primary image sensor 132), or that matches a preceding code when a timeout period has expired (e.g. 2 seconds, although other time periods can also be employed). Whether a detected barcode is new or not indicates whether a different item has been placed in the scan volume 206. Detection of a new code at block 410 results in a negative determination. When the code is not new, the determination at block 410 is affirmative, indicating that the item in the scan volume 206 is the same item as in the preceding image frame, rather than a different item.

Following an affirmative determination at block 410, the processor 116 may be configured not to send data decoded from the barcode to the host computing device 108 (because such data was already sent in connection with the previous image frame). However, the processor 116 can be configured to generate an "Imager Stable" event and proceed to block 320. An "imager stable" event indicates that the item present in the scan volume 206 is the same as a previously detected item. The event indicates that the item is currently stable within the scan volume 206 and therefore that imaging via the auxiliary image sensor 144 may be feasible. As will now be apparent, an affirmative determination at block 405 followed by a negative determination at block 410 is an example implementation of block 315 in which the event criteria for the "imager stable" event is satisfied. The performance of block 320 following such an event can include updated a most recently detected barcode indicator in the memory 120.

When the determination at block 410 is negative, indicating that the barcode detected at block 405 is different from the preceding code detected from primary image data, the processor 116 proceeds to block 415. At block 415, which represents an example implementation of block 320 as shown in FIG. 3, the processor 116 can send the data decoded from the new barcode to the host computing device 108.

Following the transmission at block 415, the processor 116 determines, at block 420, whether a "scan disable" command has been received from the host computing device 108. As will now be apparent, the performance of block 415 represents an additional implementation of block 315 (i.e. another evaluation of event detection criteria). When the determination at block 420 is negative, the data capture device 104 can simply return to block 310, or can repeat block 420 until a timeout period is reached.

When a scan disable command is received, leading to an affirmative determination at block 420, the processor 116 proceeds to block 320, where processing of the scan disable command can include interrupting image capture and/or decoding processes.

Returning to FIG. 3, following the performance of block 320, for example according to the implementations discussed above in connection with FIG. 4, the processor 116 is configured, at block 325, to determine whether the event or events detected at block 315 are registered events. That is, the processor 116 is configured to determine whether the event identifier of the event detected at block 315 appears in the repository 128 as an event to which the host computing device 108 is subscribed. In examples in which the auxiliary image sensor 144 is associated with a distinct auxiliary controller that stores event registrations as mentioned earlier, the determination at block 325 can be performed by the auxiliary controller instead of the processor 116. That is, the processor 116 can be configured to simply pass all event detections from block 315 to the auxiliary controller, and the auxiliary controller can assess whether each event is a registered event at block 325.

When the determination at block 325 is negative, the processor 116 returns to block 310 to capture further data via the primary data capture sensors. When the determination at block 325 is affirmative, however, the processor 116 proceeds to block 330. At block 330, the processor 116 controls the auxiliary image sensor 144 to capture an image frame, and sends the captured image frame to the host computing device 108. In other examples, the auxiliary image sensor 144 operates in a video mode, and therefore captures a stream of image frames throughout the performance of the method 300. In such examples, at block 330 the processor 116 is configured to retrieve the most recent frame captured by the auxiliary image sensor 144 and transmit the retrieved image frame to the host computing device 108. The processor 116 then returns to block 305. In other examples, in which the auxiliary image sensor 144 is associated with a separate auxiliary controller, the auxiliary controller performs block 330, controlling the auxiliary image sensor 144 to capture an image for transmission to the host computing device 108 via the auxiliary communications interface.

Figure 5:
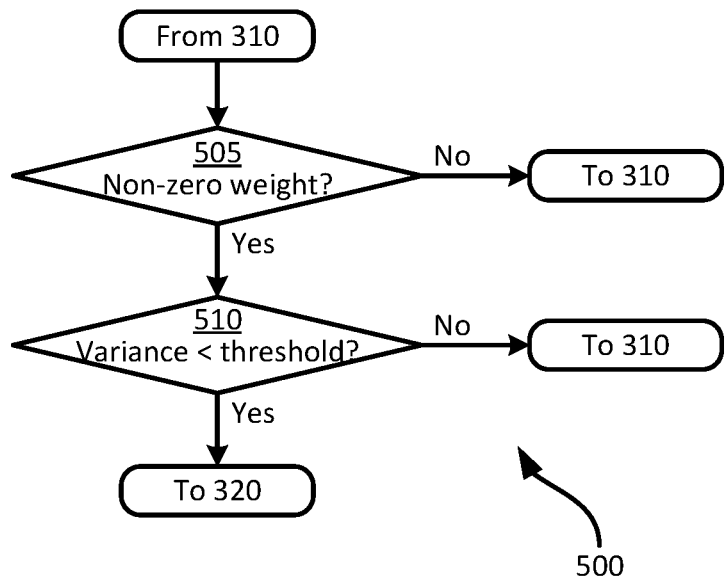
FIG. 5 is a flowchart of another method for performing block 315 of the method of FIG. 3.

Turning now to FIG. 5, another example implementation of block 315 is illustrated as a method 500, which can be performed simultaneously with the implementation shown in FIG. 4, or instead of the implementation shown in FIG. 4. In the implementation shown in FIG. 5, the data captured at block 305 includes data generated by the scale 136 (e.g. a mass of an item on the scale, in any suitable unit).

At block 505 the processor 116 is configured to determine whether the data received from the scale 136 indicates a non-zero weight. That is, the processor 116 determines whether an item is present on the platform 204. When the determination at block 505 is negative because the data from the scale 136 indicates zero weight (or a weight below a configurable threshold), the processor 116 returns to block 310.

When the determination at block 505 is affirmative, at block 510 the processor 116 determines whether a variance in the signal from the scale 136 falls below a threshold. The threshold applied at block 510 is selected such that variance below the threshold indicates that the item on the platform 204 is substantially stationary. Variance above the threshold indicates that the item is in motion, and that it may therefore not currently be feasible to obtain an accurate weight or to capture an auxiliary image of the item. For example, the threshold can include a time period (e.g. 0.5 seconds, although other time periods may also be employed) and a maximum permitted change in the data received from the scale 136 over the time period (e.g. 1 gram, although various other permitted changes can also be employed).

When the determination at block 510 is negative, indicating that the item is in motion, the processor 116 can repeat block 510, or simply return to block 310. When the determination at block 510 is affirmative, the processor 116 proceeds to block 320, and then to block 325, as discussed above.

Figure 6:
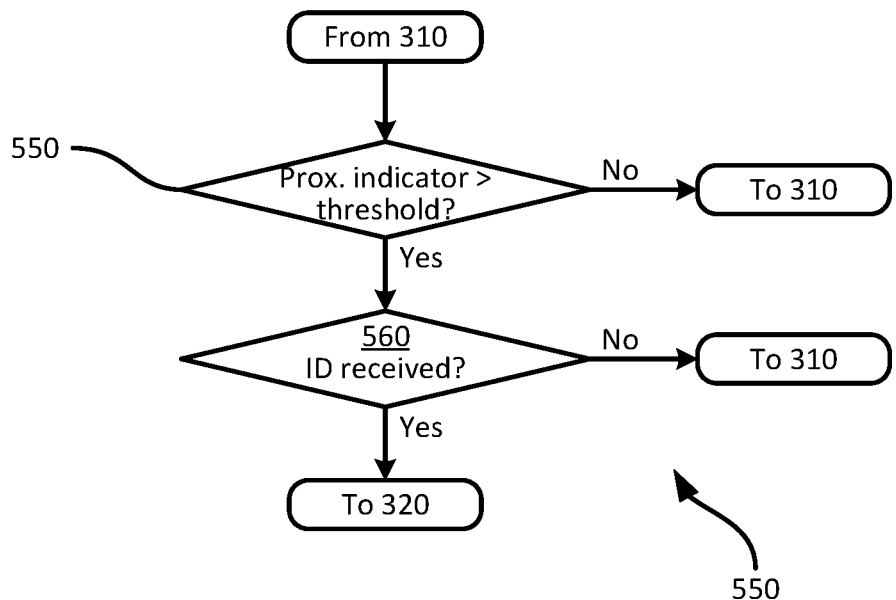
FIG. 6. is a flowchart of a further method for performing block 315 of the method of FIG. 3.

FIG. 6 illustrates a further example implementation of block 315 illustrated as a method 550, which can be performed simultaneously with the implementation shown in FIG. 4, or instead of the implementation shown in FIG. 4. In the implementation shown in FIG. 6, the data captured at block 305 includes data generated by the short-range communications interface 140. Such data can include a proximity indicator, which can be determined from various parameters including a signal strength measurement. An example of a signal strength measurement used to generate the proximity indicator is a Received Signal Strength Indicator (RSSI) representing the detected signal strength of a nearby RFID tag, EAS tag, or the like. Such data can also include an identifier or other data encoded in the above-mentioned tags, which can be received at the interface 140.

At block 555 the processor 116 is configured to determine, from a proximity indicator based on an RSSI value and/or other suitable parameters generated from a tag transmission or reflection, whether the proximity indicator exceeds a threshold selected to indicate the presence of a nearby tag. When the determination at block 555 is negative, the processor 116 returns to block 310. In other examples, the determination at block 555 includes a determination of whether the proximity indicator has exceeded the threshold continuously for at least a threshold time period (e.g. 1.5 seconds, although shorter and longer time periods are also contemplated). Such a determination indicates that the wireless tag has remained near the data capture device 104 for the time period, rather than having been detected as the wireless tag is carried past the data capture device 104.

When the determination at block 555 is affirmative, at block 560 the processor 116 determines whether a tag identifier has been received. In other words, the determinations at block 555 and 560 assess whether an RFID or EAS tag is not only close enough to the short-range interface 140, but also whether an identifier or other payload data from the tag has been retrieved by the data capture device 104.

When the determination at block 560 is negative, the processor 116 can repeat block 560, or simply return to block 310. When the determination at block 560 is affirmative, the processor 116 proceeds to block 320, and then to block 325, as discussed earlier.

The repository 128 (or, in other implementations as mentioned earlier, an auxiliary controller associated with the auxiliary image sensor 144) can contain a plurality of event registration indicators. That is, an application executed by the host computing device 108 can subscribe to more than one event. Further, multiple events may occur simultaneously, or at least within a certain time period. Under such conditions, the data capture device 104 can simply capture and send auxiliary data to the host computing device 108 for each registered event. However, this may result in redundant auxiliary data being sent to the host computing device 108. Therefore, in some examples the repository 128 can also include priority indicators for each registered event.

Figure 7:
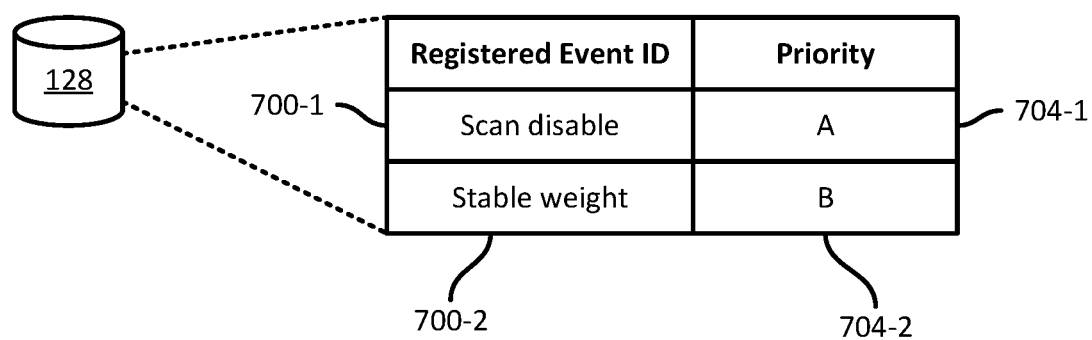
FIG. 7 is a diagram illustrating event registration indicators in the system of FIG. 1.

Turning to FIG. 7, example contents for the repository 128 is shown, including two registration indicators 700-1 and 700-2 identifying the "scan disable" event mentioned earlier, as well as a "stable weight" event detected via the method 500. In addition, the repository 128 includes a priority indicator 704-1, 704-2 corresponding to each registration indicator 700. When two or more events are detected at block 315 within a configurable time period (e.g. 0.5 seconds), the processor 116 may be configured to assess only one of the events at block 325 according to the priority indicators 704. Thus, in the example shown in FIG. 6, only the scan disable event would be processed at block 330.

The repository 128 can also include additional data, for example to specify auxiliary data capture parameters. For example, each event registration can specify different capture parameters (e.g. exposure time, flash and the like) for controlling the auxiliary image sensor 144. In other examples, the data capture device 104 can include multiple auxiliary data capture sensors, and different event registrations can configure the processor 116 to activate different ones of the auxiliary data capture sensors.

In further variations, the host computing device 108 itself can perform blocks 325 and 330. In particular, rather than the processor 116 or the auxiliary controller associated with the auxiliary image sensor 144 storing event registrations, the host computing device 108 can maintain the event registrations. The processor 116 can simply report all detected events to the host computing device 108, and the auxiliary image sensor 144 (e.g. via the auxiliary controller and communications interface) can provide a stream of images, e.g. for storage in a buffer at the host computing device 108. The host computing device 108 is then configured to determine whether an event reported by the processor 116 corresponds to an event registration, and to retrieve a relevant frame from the above-mentioned buffer when the even does correspond to an event registration.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of auxiliary data capture control, the method comprising:
   storing, at a data capture device, (i) detection criteria each corresponding to one of a plurality of events; and (ii) a registration indicator associated with at least one of the events;
   controlling a primary data capture sensor to obtain primary captured data;
   in response to detecting, based on the primary captured data, that the detection criteria are satisfied for a detected one of the events, determining whether the registration indicator is associated with the detected event; and
   when the registration indicator is associated with the detected event, controlling an auxiliary data capture sensor to obtain auxiliary captured data.

2. The method of claim 1, further comprising: transmitting the auxiliary captured data to a host computing device.

3. The method of claim 1, further comprising:
   storing, at the data capture device, first and second registration indicators and, for each registration indicator, a priority indicator.

4. The method of claim 1, wherein controlling the auxiliary data capture sensor to obtain auxiliary captured data includes controlling an auxiliary image sensor to capture an image frame.

5. The method of claim 1, wherein controlling a primary data capture sensor includes controlling a barcode scanner.

6. The method of claim 1, wherein a subset of the detection criteria includes whether the primary captured data contains an indicium, the method further comprising:
   sending the primary captured data to a host computing device.

7. The method of claim 6, wherein a further subset of the detection criteria includes whether a scan disable command has been received at the data capture device, the method further comprising:
   in response to sending the primary captured data to a host computing device, repeating the determination of whether the registration indicator is associated with the detected event, in response to receipt of a scan disable command from the host computing device.

8. The method of claim 1, wherein a subset of the detection criteria includes whether the primary captured data matches preceding primary captured data.

9. The method of claim 1, wherein a subset of the detection criteria includes whether a variance in the primary captured data over a configurable time period is below a threshold.

10. The method of claim 1, wherein a subset of the detection criteria includes whether a proximity indicator associated with a wireless tag exceeds a threshold.

11. The method of claim 1, wherein a subset of the detection criteria includes whether a wireless tag identifier has been received at the data capture device from a wireless tag.

12. A data capture device, comprising:
   a memory storing (i) detection criteria each corresponding to one of a plurality of events; and (ii) a registration indicator associated with at least one of the events;
   a primary data capture sensor;
   an auxiliary data capture sensor; and
   a processor connected with the memory, the primary data capture sensor and the auxiliary data capture sensor, the processor configured to:
      control the primary data capture sensor to obtain primary captured data;
      in response to detecting, based on the primary captured data, that the detection criteria are satisfied for a detected one of the events, determine whether the registration indicator is associated with the detected event; and
      when the registration indicator is associated with the detected event, control the auxiliary data capture sensor to obtain auxiliary captured data.

13. The data capture device of claim 12, further comprising a communications interface; wherein the processor is further configured to transmit the auxiliary captured data to a host computing device via the communications interface.

14. The data capture device of claim 12, wherein the memory further stores first and second registration indicators and, for each registration indicator, a priority indicator.

15. The data capture device of claim 12, wherein the auxiliary data capture sensor is an image sensor, and wherein the processor is configured to control the auxiliary data capture sensor to capture an image frame.

16. The data capture device of claim 12, wherein the primary data capture sensor includes a barcode scanner.

17. The data capture device of claim 12, wherein a subset of the detection criteria includes whether the primary captured data contains an indicium, and wherein the processor is further configured to send the primary captured data to a host computing device.

18. The data capture device of claim 17, wherein a further subset of the detection criteria includes whether a scan disable command has been received at the data capture device, and wherein the processor is further configured to:
   in response to sending the primary captured data to a host computing device, repeat the determination of whether the registration indicator is associated with the detected event, in response to receipt of a scan disable command from the host computing device.

19. The data capture device of claim 12, wherein a subset of the detection criteria includes whether the primary captured data matches preceding primary captured data.

20. The data capture device of claim 12, wherein the primary data capture sensor includes a scale; and wherein a subset of the detection criteria includes whether a variance in the primary captured data over a configurable time period is below a threshold.

21. The data capture device of claim 12, wherein the primary data capture sensor includes a short-range communications interface; and wherein a subset of the detection criteria includes whether a proximity indicator associated with a wireless tag exceeds a threshold.

22. The data capture device of claim 12, wherein the primary data capture sensor includes a short-range communications interface; and wherein a subset of the detection criteria includes whether a wireless tag identifier has been received at the data capture device from a wireless tag.

* * * * *